United States Patent
Claessens et al.

(10) Patent No.: US 12,202,938 B2
(45) Date of Patent: Jan. 21, 2025

(54) PROCESS FOR PREPARING A COPOLYMER POLYOL

(71) Applicant: Dow Global Technologies LLC, Midland, MI (US)

(72) Inventors: Sven Claessens, Lokeren (BE); Alexey Kirilin, Terneuzen (NL); Van Gaalen Gerrit-Jan, Axel (NL); Balamurali Sreedhar, Midland, MI (US); An Adams, Heusden (BE)

(73) Assignee: Dow Global Technologies LLC, Midland, MI (US)

( * ) Notice: Subject to any disclaimer, the term of this patent is extended or adjusted under 35 U.S.C. 154(b) by 786 days.

(21) Appl. No.: 17/424,855

(22) PCT Filed: Jan. 30, 2020

(86) PCT No.: PCT/US2020/015973
§ 371 (c)(1),
(2) Date: Jul. 21, 2021

(87) PCT Pub. No.: WO2020/163154
PCT Pub. Date: Aug. 13, 2020

(65) Prior Publication Data
US 2022/0089814 A1 Mar. 24, 2022

Related U.S. Application Data

(60) Provisional application No. 62/802,250, filed on Feb. 7, 2019.

(51) Int. Cl.
| | |
|---|---|
| C08G 65/30 | (2006.01) |
| B01D 15/26 | (2006.01) |
| B01D 15/42 | (2006.01) |
| B01J 20/18 | (2006.01) |
| B01J 20/281 | (2006.01) |
| C08G 18/08 | (2006.01) |
| C08G 18/63 | (2006.01) |
| C08G 65/329 | (2006.01) |
| C08G 65/333 | (2006.01) |
| C08G 65/46 | (2006.01) |

(52) U.S. Cl.
CPC .......... *C08G 65/30* (2013.01); *B01D 15/265* (2013.01); *B01D 15/422* (2013.01); *B01J 20/18* (2013.01); *B01J 20/281* (2013.01); *C08G 18/0876* (2013.01); *C08G 18/63* (2013.01); *C08G 65/329* (2013.01); *C08G 65/33372* (2013.01); *C08G 65/46* (2013.01); *B01J 2220/58* (2013.01); *C08G 18/633* (2013.01); *C08G 2110/0008* (2021.01); *C08G 2110/0083* (2021.01)

(58) Field of Classification Search
CPC .............. C08G 65/30; C08G 18/633; C08G 2110/0008; C08G 2110/0083; C08G 18/0876; C08G 65/329; C08G 65/33372; C08G 65/46; C08G 18/63; B01D 15/265; B01D 15/422; B01J 20/18; B01J 20/281; B01J 2220/58
See application file for complete search history.

(56) References Cited

U.S. PATENT DOCUMENTS

| | | |
|---|---|---|
| 3,278,457 A | 10/1966 | Milgrom |
| 3,278,458 A | 10/1966 | Belner |
| 3,278,459 A | 10/1966 | Herold |
| 3,327,334 A | 6/1967 | Wilmanns et al. |
| 3,404,109 A | 10/1968 | Milgrom |
| 3,427,256 A | 2/1969 | Milgrom |
| 3,427,335 A | 2/1969 | Herold |
| 4,513,124 A | 4/1985 | Hoffman |
| 4,588,830 A | 5/1986 | Fisk et al. |
| 4,640,935 A | 2/1987 | Fisk et al. |

(Continued)

FOREIGN PATENT DOCUMENTS

| | | |
|---|---|---|
| EP | 0786480 | 7/1997 |
| EP | 1675885 | 7/2006 |

(Continued)

OTHER PUBLICATIONS

Office Action from corresponding Chinese application: 202080015367.4 dated Dec. 28, 2022.

(Continued)

*Primary Examiner* — Rabon A Sergent

(57) ABSTRACT

A process for preparing a copolymer polyol containing a reduced content of residual monomers and volatiles including the steps of: (a) providing at least one copolymer polyol containing a first initial content of residual monomers and volatiles; (b) providing at least one molecular sieve adsorbent; (c) contacting the at least one copolymer polyol with the at least one molecular sieve adsorbent for a period of time and at a temperature sufficient for the at least one molecular sieve adsorbent to adsorb at least a portion of the first initial content of residual monomers and volatiles present in the at least one copolymer polyol to reduce the first initial content of residual monomers and volatiles of the at least one copolymer polyol to form at least one copolymer polyol containing a second reduced content of residual monomers and volatiles; and (d) separating the at least one molecular sieve adsorbent containing a portion of the first initial content residual monomers and volatiles from the at least one copolymer polyol to form at least one copolymer polyol containing a second reduced content of residual monomers and volatiles.

8 Claims, No Drawings

(56) References Cited

U.S. PATENT DOCUMENTS

| | | | |
|---|---|---|---|
| 4,745,153 | A | 5/1988 | Hoffman |
| 4,997,957 | A | 3/1991 | Meul et al. |
| 5,081,180 | A | 1/1992 | Bourguignon et al. |
| 5,196,476 | A | 3/1993 | Simroth |
| 5,854,386 | A | 12/1998 | Shen et al. |
| 5,990,785 | A | 11/1999 | Suda |
| 6,013,731 | A | 1/2000 | Holeschovsky et al. |
| 6,207,794 | B1 | 3/2001 | Yamasaki et al. |
| 6,613,827 | B2 | 9/2003 | Lundgard et al. |
| 7,160,975 | B2 | 1/2007 | Adkins et al. |
| 7,179,882 | B2 | 2/2007 | Adkins et al. |
| 7,759,427 | B2 | 7/2010 | Wood et al. |
| 7,776,969 | B2 | 8/2010 | Adkins |
| 2004/0266958 | A1 | 12/2004 | Borst et al. |
| 2005/0085613 | A1 | 4/2005 | Adkins et al. |
| 2006/0116275 | A1 | 6/2006 | Hinz et al. |
| 2007/0060690 | A1 | 3/2007 | Adkins et al. |
| 2009/0281206 | A1 | 11/2009 | Van der Wal et al. |
| 2013/0345331 | A1 | 12/2013 | Suzuki et al. |

FOREIGN PATENT DOCUMENTS

| | | | |
|---|---|---|---|
| JP | 10-195191 A | * | 7/1998 |
| WO | 2009155427 | | 12/2009 |

OTHER PUBLICATIONS

PCT/US2020/015973, International Search Report and Written Opinion with a mailing date of May 19, 2020.

* cited by examiner

PROCESS FOR PREPARING A COPOLYMER POLYOL

FIELD

The present invention relates to a process for preparing a copolymer polyol; and more specifically, the present invention relates to preparing a copolymer polyol having a reduced content of residual monomers and volatile components by removing at least a portion of the residual monomers and volatile components from the copolymer polyol composition using a molecular sieve adsorbent.

BACKGROUND

Various polyurethane foam systems are known for producing flexible polyurethane foams for a wide variety of commercial applications such as in cushioning, seating, bedding, furniture, transportation interiors, carpet underlay, and packaging applications. Generally, a reaction mixture of a polyol with a polyisocyanate, and other additives such as catalysts are used to prepare a foam-forming polyurethane reaction mixture composition which, in turn, can be used to produce a flexible polyurethane foam. Copolymer polyols (CPP) can be used as the polyol reactant in a foam manufacturing process. In the production of a polyurethane (PU) foam, the CPP reactant is reacted with a polyisocyanate reactant in the reaction step to form the foam. A typical CPP product can be a stable dispersion of styrene-acrylonitrile (SAN) copolymer particles suspended in a polyether polyol.

Heretofore known CPP products, that are used as a reactant in a foam-forming process, usually have a significant concentration of residual monomers (i.e., styrene and acrylonitrile monomers) present in the final CPP product after the CPP is produced. The residual monomers are the unconverted portion of the reactants from a prior dispersion polymerization reaction step carried out in a process to manufacture SAN particles. In the process of making SAN particles, typically, the residual monomers are stripped out of the CPP product after the above polymerization reaction step. The stripping can be done using various stripping agents (e.g., nitrogen, isopropanol, steam and the like) in a variety of different ways (e.g., batch and continuous systems).

One major issue of the known CPP technology is that a significant amount of residual monomers of styrene and acrylonitrile still remain in the CPP product, even after the stripping step above. And, the presence of such residual monomers in the CPP product contributes significantly to volatile organic compounds (VOC) emissions in the finished flexible PU foam product that is produced using the CPP product containing residual monomers.

For ecological and toxicological reasons, but also to minimize the so-called fogging effect (deposition of thin but highly light-refracting films on the insides of glass panels/windscreens by heat-induced migration of volatile substances from the used materials) caused by plastics parts incorporated in automobile interiors, the removal of volatile constituents such as residual monomers, chain transfer agents or residual low molecular weight reaction products such as recombination or reaction products of the employed polymerization initiator is becoming increasingly important also in the production of CPP products.

Some processes described in the art disclose purification steps that need high process temperatures (e.g., up to 160 degrees Celsius [° C.] or above), which is energetically unfavorable and which is often associated with discoloration (yellowing) of the final product. Thus, in view of the VOC problems related to residual monomers in CPP, a more efficient process is needed to remove residual monomers from the CPP.

SUMMARY

The present invention is directed to a novel technique of removing residual monomers (which can lead to removing VOCs) out of a CPP product by using at least one or more molecular sieve adsorbents. In some embodiment, the molecular sieve adsorbent can be zeolite. In other embodiments, the molecular sieve adsorbent can be activated carbon. In one embodiment, the molecular sieve adsorbent of the present invention can include, for example, a Y-type zeolite in the H-form, as an adsorbent, to remove remaining residual amounts of VOC from a CPP such as a CPP which has already been processed through a stripping operation. For example, certain molecular sieve adsorbents, such as the aforementioned zeolite, have the capability of removing, or at least reducing, residual styrene from CPP. As one illustration, and not to be limited thereby, for example, a styrene content of 85 parts per million (ppm) originally present in a CPP composition can be reduced to a styrene content of 20 ppm by adding 10 weight percent (wt %) of a molecular sieve adsorbent, such as a zeolite, to the CPP composition, after processing the CPP composition with the molecular sieve adsorbent, such as a zeolite, for 1 hour (hr) at 125° C.

In accordance with the present invention, one general embodiment of the present invention relates to a process for preparing a copolymer polyol containing a reduced content of residual monomers and volatiles including the steps of:
  (a) providing at least one copolymer polyol containing a first initial content of residual monomers and volatiles;
  (b) providing at least one molecular sieve adsorbent;
  (c) contacting the at least one copolymer polyol with the at least one molecular sieve adsorbent for a period of time and at a temperature sufficient for the at least one molecular sieve adsorbent to adsorb at least a portion of the first initial content of residual monomers and volatiles present in the at least one copolymer polyol to reduce the first initial content of residual monomers and volatiles of the at least one copolymer polyol to form at least one copolymer polyol containing a second reduced content of residual monomers and volatiles; and
  (d) separating the at least one molecular sieve adsorbent containing a portion of the first initial content residual monomers and volatiles from the at least one copolymer polyol to form at least one copolymer polyol containing a second reduced content of residual monomers and volatiles.

In one embodiment, the contacting step (c) of the process can be carried out by adding the at least one molecular sieve adsorbent to the at least one copolymer polyol to form a mixture and then mixing the mixture for a sufficient contact time period and contact temperature such that the at least one molecular sieve adsorbent adsorbs at least a portion of the residual monomers and volatiles present in the at least one copolymer polyol.

In still other embodiments, the process of the present invention can be a batch process or a continuous process. For example, when a batch process is used, an embodiment of the process may include a filter feed vessel, which contains a slurry mixture of at least one copolymer polyol with at least one molecular sieve adsorbent such that the at least one copolymer polyol contacts the at least one molecular sieve adsorbent for a sufficient contact time period and contact temperature such that the at least one molecular sieve adsorbent adsorbs at least a portion of the residual monomers and volatiles present in the at least one copolymer polyol. In the next step of this embodiment the slurry mixture is fed over a suitable filter with an appropriate pore size such that the at least one molecular sieve adsorbent is separated from the at least one copolymer polyol. The molecular sieve adsorbent may or may not be recycled to the filter feed vessel for reuse.

For example, when a continuous process is used, one embodiment of the process may include using a tubular vessel (or adsorption column) packed with the at least one molecular sieve adsorbent. In this continuous process, the contacting step (c) of the process can be carried out by passing the at least one copolymer polyol through the tubular vessel packed with the at least one molecular sieve adsorbent (i.e., the at least one copolymer polyol enters one end of the packed tubular vessel and exits the opposite end of the packed tubular vessel) such that the at least one copolymer polyol contacts the at least one molecular sieve adsorbent for a sufficient contact time period and contact temperature such that the at least one molecular sieve adsorbent adsorbs at least a portion of the residual monomers and volatiles present in the at least one copolymer polyol.

For example, when a continuous process is used, another embodiment of the process may include using a composite membrane with a portion made from the at least one molecular sieve adsorbent material. In this continuous process, the contacting step (c) of the process can be carried out bypassing the at least one copolymer polyol along one side of a composite membrane, a part of which is made from the at least one molecular sieve adsorbent material such that the at least one copolymer polyol contacts the composite membrane for a sufficient contact time period and contact temperature such that the at least one molecular sieve adsorbent portion of the membrane facilitates permeation of at least a portion of the residual monomers and volatiles present in the at least one copolymer polyol to the other side of the membrane, with a portion of the copolymer polyol stream remaining as the retentate.

In the above embodiments, the contacting step (c) of the at least one copolymer polyol with the at least one molecular sieve adsorbent is carried out for a period of time of, for example, from 15 minutes (min) to 2 hr and at a temperature of, for example, from 70° C. to 160° C.

By removing at least a part of the initial residual monomers and volatiles from a copolymer polyol using a zeolite, a more purified (or pure) copolymer polyol can be obtained, i.e., a copolymer polyol containing a reduced content of residual monomers and volatiles can be produced using a less complicated process. Then, the purified CPP can be used as starting material for producing a polyurethane foam with improved properties.

DETAILED DESCRIPTION

An "adsorbent" herein means a chemical substance which removes or reduces the amount of residual monomers and volatiles in CPP. The adsorbent can be, for example, an activated carbon or a molecular sieve or a combination there of.

A "molecular sieve" herein means natural or synthetic porous crystalline inorganic solid materials that are formed from alternating $SiO_4$ and $AlO_4$ tetrahedra (zeolites) or from $AlO_4$ and $PO_4$ tetrahedra (AlPO) or from $SiO_4$, $AlO_4$ and $PO_4$ tetrahedra (SAPO) as described in *Sustainable Catalytic Processes* (Eds.: B. Saha, M. Fan, J. Wang), Elsevier, Amsterdam, 2015, 1st Edition, ISBN 978-0-444-59567-6.

A "zeolite" herein means natural or synthetic porous inorganic solid material that is based on a three-dimensional network of $SiO_4$ and $AlO_4$ tetrahedra.

A "residual monomer", with reference to a compound, herein means an ethylenically unsaturated monomer with a molecular weight of up to 150 grams per mole (g/mol).

A "volatile", with reference to a compound, herein means a low molecular weight compound with a boiling point of up to 250° C.

In a general embodiment, the present invention includes contacting: at least one copolymer polyol containing a first initial content of residual monomers and volatiles with at least one molecular sieve adsorbent for removing at least a portion of a first initial residual monomers and volatiles present in the at least one copolymer polyol from the at least one copolymer polyol; and reducing the initial residual monomers and volatiles content of the at least one copolymer polyol to a second reduced content of residual monomers and volatiles in the at least one copolymer polyol.

The copolymer polyol (CPP) (also referred to as a "modified polyol" or a "polymer polyol" or a "graft polyol") useful in the present invention can be a blend or admixture of polyol compounds. The CPP containing a first initial concentration of residual monomers and volatiles can be obtained from any well-known CPP production process. Such CPP compounds have been fully described in the prior art and an example of a process for manufacturing a CPP product, for example, is described in U.S. Pat. Nos. 4,513,124; 4,588,830; 4,640,935; 5,854,386; 4,745,153; 5,081,180; and 6,613,827; and in EP 1 675 885. In general, the methods described in the above references include dispersing low molecular monomer(s) in the form of droplets in a polyol and in the presence of a stabilizer, and subjecting the dispersed monomer droplets to polymerization conditions until the monomer droplets are converted to solid polymer particles dispersed in a continuous polyol phase.

For example, a CPP product can be obtained by the in situ polymerization of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol. In one preferred embodiment, the CPP products which are particularly interesting in accordance with the present invention can include products obtained by in situ polymerization of styrene and/or acrylonitrile in polyoxyethylene polyoxypropylene polyols and/or products obtained by in situ reaction between a polyisocyanate and an amino or hydroxy-functional compound (such as triethanolamine) in a polyoxyethylene polyoxypropylene polyol.

Stability is an important characteristic of polymer polyols. The dispersed phase must remain distributed within the polyol phase for extended periods as the polymer polyol is stored, transported and used. In addition, polymer polyol products often experience large swings in temperature during storage and transportation, and must remain stable across the entire temperature range. If the dispersion is unstable, some or all of the dispersed polymer phase can settle out. This leads to fouling of transportation, storage and processing equipment, inconsistencies in the polymer polyol product and inconsistencies in polyurethanes made from the polymer polyol.

Stability is improved through the use of stabilizers. The stabilizer contains polyol-soluble groups, typically polyether chains which can have molecular weights up to several thousand. The stabilizer resides at the surface of the dispersed polymer particles, where the polyol-soluble groups are believed to stabilize the particles through the interaction of these polyol-soluble groups with the continuous polyol phase. One common type of stabilizer is a "macromer" compound, typically a polyether polyol, in which one or more of the hydroxyl groups are capped with a group that contains polymerizable unsaturation. This type of stabilizer copolymerizes with styrene and acrylonitrile, and in doing so introduces polyol-soluble moieties onto the copolymer particles. In some cases, the macromer is partially homopolymerized or copolymerized with a small amount of one or more other monomers to form a preformed stabilizer. Examples of macromers and preformed stabilizers of this type are described, for example, in U.S. Pat. Nos. 4,513,124; 4,588,830; 4,640,935; 4,745,153; 4,997,957; 5,081,180; 5,196,476; 5,854,386; 5,990,185; 6,013,731; 6,613,827; 7,160,975; 7,179,882; 7,759,427; and 7,776,969; U.S. Patent Application Publications Nos. US 2004-0266958, US 2005-0085613, US 2007-0060690, and U52009-0281206; EP 0 786 480; EP 1,675,885; and WO 2009/155427.

Polyether polyols include, for example, polymers of propylene oxide, ethylene oxide, 1,2-butylene oxide, tetramethylene oxide, block and/or random copolymers thereof, and the like. The polyether polyols may contain low levels of terminal unsaturation (for example less than 0.02 milliequivalents per gram (meq/g) or less than 0.01 meq/g). Examples of such low unsaturation polyether polyols include those made using so-called double metal cyanide (DMC) catalysts as described for example in U.S. Pat. Nos. 3,278,457; 3,278,458; 3,278, 459; 3,404,109; 3,427,256; 3,327,334; and 3,427,335.

Various other ingredients may be present during the polymer polyol production process, in addition to the polyol (s), low molecular weight monomer(s) and stabilizer(s). A polymerization catalyst preferably is present. The polymerization catalyst preferably is a free radical initiator that generates free radicals under the conditions of the polymerization process. Examples of suitable free-radical initiators include peroxy compounds such as peroxides, persulfates, perborates, percarbonates, azo compounds and the like. Specific examples of free-radical initiators include hydrogen peroxide; di(decanoyl)peroxide; dilauroyl peroxide; t-butyl perneodecanoate; 1,1-dimethyl-3-hydroxybutyl peroxide-2-ethyl hexanoate; di(t-butyl)peroxide; t-butylperoxydiethyl acetate; t-butyl peroctoate; t-butyl peroxy isobutyrate; t-butyl peroxy-3,5,5-trimethyl hexanoate; t-butyl perbenzoate; t-butyl peroxy pivalate; t-amyl peroxy pivalate; t-butyl peroxy-2-ethyl hexanoate; lauroyl peroxide; cumene hydroperoxide; t-butyl hydroperoxide; azo bis(isobutyronitrile); 2,2'-azo bis(2-methylbutyronitrile); and the like. Two or more catalysts may be used. The amount of catalyst may range from 0.01 wt % to 5 wt %, preferably 0.0.1 wt % to 3 wt %, based on the weight of the low molecular weight monomer(s).

A molecular weight regulator, such as a chain transfer agent is another useful ingredient. Examples of these include low molecular weight aliphatic alcohols such as isopropanol, ethanol, t-Butanol, toluene, ethylbenzene, trimethylamine, mercaptans such as dodecylmercaptane and octadecylmercaptane and chlorinate alkanes such as carbon tetrachloride, chloroform, methylene chloride; and the like. These chain transfer agents are typically present (if used at all) in amounts ranging from 0.01 wt % to 3 wt %, preferably 0.25 wt % to 2 wt %, based on the weight of low molecular weight monomers.

The polymerization can be performed continuously, or in various batch and semi-batch processes. A continuous process is characterized by the continuous introduction of polyol(s), stabilizer, and low molecular weight monomers into the polymerization, and continuous withdrawal of product. In a semi-batch process, at least a portion of the low molecular weight monomers is continuously or intermittently introduced into the polymerization, but product is not continuously withdrawn, preferably not being removed until the polymerization is completed. In the semi-batch process, some or all of the polyol(s) and/or stabilizer may be added continuously or intermittently during the process, but the entire amounts of those materials may instead be charged to the polymerization apparatus prior to the start of the polymerization. In a batch process, all polyol(s), stabilizer(s) and low molecular weight monomers are charged at the beginning of the polymerization, and product is not removed until the polymerization is completed.

Generally, in a typical CPP production process a CPP product can be produced having a first initial concentration of residual monomers and volatiles of from 10 ppm to 2,000 ppm in one embodiment; from 10 ppm to 500 ppm in another embodiment; and from 50 ppm to 500 ppm to in still another embodiment. To determine the concentration of residual monomers and volatiles, the method described in, for example, ASTM D4526 "12 Standard Practice for Determination of Volatiles in Polymers by Static Headspace Gas Chromatography", can be used.

The residual monomers present in the CPP product used in the present invention in general include for example styrene, and acrylonitrile.

Exemplary of the volatiles present in the CPP product (prior to treating the CPP product with a molecular sieve) can include, but is not limited thereto, acetaldehyde, propionaldehyde, isopropanol, acetone, acrolein, dioxolanes (such as 2,2-dimethyl-1,3-dioxolane, 2,2,4-trimethyl-1,3-dioxolane), toluene, ethylbenzene, dimethylbenzene, allylalcohol, isopropylbenzene, propylbenzene, phenyloxirane, n-dodecanethiol, octadecanethiol, trimethylamine, tetramethylsuccinonitrile and mixtures thereof.

The adsorbent material useful in the present invention and added to the CPP, can be selected from various types of materials. For example, the adsorbent can be an activated carbon or a molecular sieve adsorbent; and in some embodiments, the molecular sieve can be selected from molecular sieves having a framework type selected from the group consisting of the following framework types Mordenite (MOR), Beta polymorph A (BEA), Faujasite (FAU), Zeolite Socony Mobil—five (MFI), and combinations thereof. The above names of the framework types correspond to the naming convention of the International Zeolite Association. It should be understood that in some embodiments, both aluminosilicate and silicoaluminophosphate frameworks may be used. These types of adsorbents may include, but are not limited to, BEA embodiments selected from, for example, BETA; MFI embodiments selected from, for example, ZSM-5; MOR embodiments selected from, for example, Mordenite; FAU embodiments selected from, for example, X and Y. It should also be understood that the molecular sieve adsorbent may have different membered framework type depending on the desired adsorbent performance. For instance, a molecular sieve adsorbent with an FAU framework type could be used for removing styrene volatiles. And, in another embodiment, a molecular sieve adsorbent with a MOR framework type could be used for removal of toluene volatiles. In still another embodiment, a molecular sieve adsorbent for removal of toluene volatiles may be an activated carbon.

In a preferred embodiment, the molecular sieve adsorbent can be a zeolite compound. Zeolites can be used to separate molecules (only molecules of certain sizes and shapes can pass through). Zeolites can also be used as traps for molecules so the molecules can be analyzed. And, while some zeolite molecular sieves have been used as ion-exchange beds in water purification and softening applications, heretofore, known zeolites or other molecular sieve adsorbents have not been used in a process for producing a CPP product. One reason may be that there is an enormous variation in the compositional features of zeolite compounds and the capability of zeolites to effectively function as an adsorbent to remove residual monomers from CPP. It has been found that certain zeolite types have the capability to remove residual monomers and volatiles such as styrene from CPP, while a large number of other certain zeolite types are non-effective in removing certain residual monomers and volatiles such as styrene from CPP. Thus, not all zeolite compounds or dosages of zeolite compounds perform alike to provide a workable zeolite process that removes residual monomers from CPP; and in turn, provides a foam product with lower VOC emissions and with other beneficial properties.

The zeolite compound, i.e., a microporous, aluminosilicate mineral, useful as the adsorbent in the present invention and added to the CPP, can be selected from various types of zeolites, so long as the zeolite compound is capable of removing residual monomers and volatiles from a CPP. In one preferred embodiment, the zeolite compound can be, for example, a zeolite having a faujasite type framework or structure; and more specifically a "Y-type" zeolite (i.e., a zeolite having a silica-to-alumina ratio in the zeolite's framework of 3 or higher as opposed to an X-type zeolite having a silica-to-alumina ratio of between 2 and 3).

Exemplary of the zeolites useful in the present invention include Y, ZMS-5, Beta and Mordenite and mixtures thereof. Various commercial zeolites useful in the present invention can include, for example, ZSM-5 (available from Zeolyst, Zeochem and Zeocat), BETA (available from East-BioChem), Mordenite (available from Zeolyst), Y-type zeolites (available from Zeolyst). The zeolites can be used in different forms including for example H$^+$, Na$^+$, and NH$_4$ forms. It should be understood that other ion-exchanged forms of zeolites with alkali, alkaline earth or other cations can also be used.

In one embodiment, Y zeolite (faujasite type structure) with different SiO$_2$/Al$_2$O$_3$ ratios (effect of acidity) and/or ion-exchanged with different cations can be used in the present invention. In general, the silica-to-alumina (SiO$_2$/Al$_2$O$_3$ [mol/mol]) ratio can be, for example, from 3 to 360 in one embodiment, from 3 to 300 in another embodiment, from 3 to 250 in still another embodiment, 3 to 200 in yet another embodiment, and from 5.1 to 200 in even still another embodiment.

For example, in a preferred embodiment, a zeolite such as ZSM-5, can be modified with alkali, alkaline earth, lanthanide—metal to increase the adsorption capacity of the zeolite. In another preferred embodiment, the type of zeolite useful in the present invention includes an H—Y type with a SiO$_2$/Al$_2$O$_3$ (mol/mol) ratio of 5.1.

In another embodiment, zeolite types which may be useful in the present invention, can include, for example, MCM-22 having Mobil Composition of Matter-twenty-two structure (MWW) structure. In still another embodiment, zeolites such as silico-aluminophospates may be useful including, for example, SAPO-34, SAPO-11, SAPO-5, SAPO-36, SAPO-41 and mixtures thereof.

Zeolites in powder form, in general, cannot be filtered off; and therefore, in a preferred embodiment, the zeolites can be applied as pellets which are removable by filtration. In an alternative embodiment, zeolites (and/or molecular sieves 13X) with larger pore sizes may be useful, with the above described zeolites, for the removal of other molecules in the CPP product. It should be understood that in the extrudates form zeolites typically contain a binder.

The molecular sieves and activated carbon can be recovered by removing the volatiles and monomers by processes known to those skilled in the art to recycle the adsorbent for further reuse.

In one general embodiment, the process of the present invention is directed to removing residual monomers and volatiles from a copolymer polyol and for preparing a copolymer polyol containing a reduced content of residual monomers and volatiles includes the steps of:
(a) providing at least one copolymer polyol containing a first initial content of residual monomers and volatiles;
(b) providing at least one molecular sieve adsorbent; (c) contacting the at least one copolymer polyol with the at least one molecular sieve adsorbent for a period of time and at a temperature sufficient for the at least one molecular sieve adsorbent to adsorb at least a portion of the first initial content of residual monomers and volatiles present in the at least one copolymer polyol to reduce the first initial content of residual monomers and volatiles of the at least one copolymer polyol to form at least one copolymer polyol containing a second reduced content of residual monomers and volatiles; and (d) separating the at least one molecular sieve adsorbent containing a portion of the first initial content residual monomers and volatiles from the at least one copolymer polyol to form at least one copolymer polyol containing a second reduced content of residual monomers and volatiles.

Once the at least one copolymer polyol containing a second reduced content of residual monomers and volatiles is recovered using the above process, the copolymer polyol can be used to produce a polyurethane foam-forming reaction mixture composition as described herein below; or the copolymer can be used in other applications.

As described above, the CPP product useful in the present invention is generally a blend or admixture of polyol compounds. However, in another embodiment, other different polyol compounds can be added to the CPP product prior to contacting the CPP with the adsorbent. A CPP product containing a first initial concentration of residual monomers and volatiles can be obtained, for example, by a known process such as in situ polymerization of styrene and/or acrylonitrile in polyoxyethylene polyoxypropylene polyols and/or products obtained by in situ reaction between a polyisocyanate and an amino or hydroxy-functional compound (such as triethanolamine) in a polyoxyethylene polyoxypropylene polyol. The CPP product component as described above, can have an initial concentration of residual monomers and volatiles of from 50 ppm to 5,000 ppm in one general embodiment. Typically, a stripping section, step or operation is used in a conventional process for purifying a CPP product; and the stripping process can effectively remove VOCs from the CPP product to levels of from 50 ppm to 500 ppm. However, using a conventional stripping operation, it is very difficult remove VOCs from the CPP product to concentrations of below 50 ppm.

Accordingly, some preferred embodiments of the present invention include the following: (1) providing a novel technique, process step, or process operation such as a zeolite adsorbent operation and using equipment for such operation such as for example a zeolite unit for removing all, or substantially all (e.g., to a concentration of less than 50 ppm), the residual monomers out of a CPP product; and thus, eliminating all, or substantially all, of the VOCs present in a PU foam product which is produced using the CPP product; (2) providing a novel technique that would at least minimize the concentration (e.g., a concentration of less than 50 ppm) of undesired monomers remaining in the CPP product after the CPP product is produced; (3) providing a novel technique that could operate in addition to, in conjunction with, or ancillary to typically employed conventional stripping methods, such as thin film evaporators; and/or (4) providing a novel technique that would partially or fully eliminate the need for typically employed stripping methods.

In a preferred embodiment, a zeolite adsorbent operation can be added to a process for producing a CPP product after a conventional stripping section which is typically employed in a process for producing a CPP product. In this preferred embodiment, a CPP with a certain monomer content can be processed through a stripper; and then a CPP having a first reduced monomer content can exit the stripper. The CPP with the first reduced monomer content exiting the stripper can then be fed to a zeolite unit having a zeolite molecular sieve adsorbent. A CPP having a second reduced monomer content can then exit the zeolite unit. In another preferred embodiment, the conventional stripping section can be fully or partially replaced with the zeolite unit operation.

As described above, the molecular sieve adsorbent useful in the present invention can be at least one molecular sieve adsorbent capable of removing at least a portion of the residual monomers and volatiles from the copolymer polyol product.

The process of the present invention includes the step of (c) contacting the at least one copolymer polyol with the at least one molecular sieve adsorbent for a period of time and at a temperature sufficient for the at least one molecular sieve adsorbent to adsorb at least a portion of the first initial content of residual monomers and volatiles present in the at least one copolymer polyol to reduce the first initial content of residual monomers and volatiles of the at least one copolymer polyol to form at least one copolymer polyol containing a second reduced content of residual monomers and volatiles. This step (c) can be carried out using various means which include, but not limited thereto, for example, by: (1) first preparing a CPP precursor composition by mixing component (a) with component (b) to form a mixture which is then further processed to separate and recover the CPP product; (2) by passing component (a) through a tubular vessel packed with component (b); or (3) by passing component (a) alongside a composite membrane made of component (b).

Step (d) of the process of the present invention includes separating the at least one molecular sieve adsorbent containing a portion of the first initial content residual monomers and volatiles from the at least one copolymer polyol to form at least one copolymer polyol containing a second reduced content of residual monomers and volatiles. In this step (d) and of the well-known processes for separation such as packed bed columns, filtration beds, and centrifugation can be used.

In one general embodiment, the process of the present invention for removing residual monomers and volatiles from the at least one copolymer polyol includes a contacting step which can be simply mixing (a) the CPP and (b) the adsorbent, and (c) any optional components, if desired to form a CPP precursor material or composition including a combination of (i) a CPP product having a first reduced content of residual monomers and volatiles, and (ii) a molecular sieve adsorbent material containing an amount of adsorbed content of residual monomers and volatiles. Then, the CPP precursor composition can be processed further to remove the CPP product having a second reduced content of residual monomers and volatiles, component (i) from the molecular sieve adsorbent material containing an amount of adsorbed content of residual monomers and volatiles, component (ii).

To form the copolymer polyol precursor mixture or composition of CPP and adsorbent, in one embodiment the adsorbent can be added to the CPP; and in another embodiment the CPP can be added to the adsorbent. Then, any optional components can be added to the CPP and/or the adsorbent. Thereafter, the CPP, the adsorbent, and any optional components can be mixed together at a predetermined contact period of time and a predetermined temperature sufficient to reduce the residual monomers and volatiles content of the copolymer polyol. The mixing of the components can be carried out in any order.

Some other embodiments of the present invention can include, for example, the following: (1) the CPP can be added to a packed column of zeolite pellets; (2) the zeolites can be added to a stirred batch vessel containing CPP; and (3) the CPP can be added to a filter slurry preparation vessel (wherein the vessel is preloaded with zeolites) which in this embodiment, the CPP is added to the vessel, the CPP is then mixed with the zeolites, and then a slurry is pumped out to a filter operation.

The CPP compound used in the present invention process can be the CPP product described above; and the molecular sieve compound useful as the adsorbent in the present invention can be selected from various types of molecular sieve adsorbents which have been described above.

In general, the optimum loading amount of molecular sieve adsorbent added to a CPP product to make up the CPP precursor composition can be, for example, from 1 wt % to 15 wt % in one embodiment, from 1 wt % to 10 wt % in another embodiment and from 5 wt % to 10 wt % in still another embodiment. Thus, the amount of CPP product that makes up the CPP precursor composition can be, for example, from 85 wt % to 99 wt % in one embodiment, from 90 wt % to 99 wt % in another embodiment and from 90 wt % to 95 wt % in still another embodiment. Adding more than 15 wt % molecular sieve to the CPP product can become uneconomical; and adding less than 1 wt % molecular sieve to the CPP product may not remove adequately the VOCs in the CPP product.

The copolymer polyol precursor composition including components (a) and (b) above, can also include various optional compounds, agents or additives for an intended use. For example, some of the optional components (c) which can be added to copolymer polyol precursor composition can include for example other different polyols. When other different polyols are added to copolymer polyol precursor composition, the concentration can be from 0.01 wt % to 20 wt % in one embodiment, from 0.1 wt % to 15 wt % in another embodiment, and from 1 wt % to 10 wt % in still another embodiment.

In carrying out the mixing step of mixing (a) the CPP and (b) the adsorbent, and (c) any optional components, if desired to form the CPP precursor composition, the contact period of time and temperature during the mixing should be sufficient to reduce the residual monomers and volatiles content of the copolymer polyol to form a copolymer polyol containing a second optimum reduced concentration of residual monomers and volatiles. For example, step (c) of the process can be carried out for a contact time of from 15 min to 150 min in one embodiment, from 15 min to 120 min in another embodiment, from 15 min to 90 min in still another embodiment; from 15 min to 50 min in yet another embodiment; and from 15 min to 40 min in even still another embodiment.

The temperature of the mixing step (c) of the present invention can be from 70° C. to 160° C. in one embodiment, from 70° C. to 150° C. in another embodiment, and from 95° C. to 150° C. in still another embodiment.

After processing the mixture of CPP and molecular sieve adsorbent, or the copolymer polyol precursor composition at the process conditions described above, the resulting mixture includes (a) at least one copolymer polyol containing a reduced content of residual monomers and volatiles; and (b) at least one molecular sieve adsorbent which contains a content of adsorbed of residual monomers and volatiles. It is desired to remove as much of the original residual monomers and volatiles content (i.e., the initial residual monomers and volatiles content prior to adding the at least one molecular sieve adsorbent) of the at least one copolymer polyol, such that the concentration remaining in the at least one copolymer polyol is less than 50 ppm. Using the process of the present invention, it has been unexpectedly found that the residual monomers and volatiles content initially present in the CPP product can be reduced to a concentration range of from 0 ppm to 50 ppm in one embodiment; from 1 ppm to 40 ppm in another embodiment; and from 1 ppm to 20 ppm in still another embodiment.

In a preferred embodiment, the molecular sieve adsorbent compound useful in the present invention includes an adsorbent that is capable of reducing the maximum styrene content of the CPP product as possible. For example, the optimum styrene content of the CPP product can be from 0 ppm to 50 ppm in one embodiment, from 1 ppm to 40 ppm in another embodiment, and from 1 ppm to 20 ppm in still another embodiment. Similarly, for an acrylonitrile monomer, the optimum acrylonitrile content of the CPP product can be from 0 ppm to 25 ppm in one embodiment, from 1 ppm to 20 ppm in another embodiment, and from 1 ppm to 10 ppm in still another embodiment.

For example, when a batch process is used, an embodiment of the process may include a filter feed vessel, which contains a slurry mixture of at least one copolymer polyol with at least one molecular sieve adsorbent such that the at least one copolymer polyol contacts the at least one molecular sieve adsorbent for a sufficient contact time period and contact temperature such that the at least one molecular sieve adsorbent adsorbs at least a portion of the residual monomers and volatiles present in the at least one copolymer polyol. In the batch process, the contacting of the at least one copolymer polyol with the at least one molecular sieve adsorbent can be carried out for a period of time of, for example, from 15 min to 2 hr and at a temperature of, for example, from 70° C. to 160° C. In the next step of this embodiment the slurry mixture is fed over a suitable filter with an appropriate pore size (e.g., greater than or equal to 200 microns) such that the at least one molecular sieve adsorbent is separated from the at least one copolymer polyol. The molecular sieve adsorbent may or may not be recycled to the filter feed vessel for reuse.

For example, when a continuous process is used, one embodiment of the process may include using a tubular vessel (or adsorption column) packed with the at least one molecular sieve adsorbent. In this continuous process, the contacting step (c) of the process can be carried out by passing the at least one copolymer polyol through the tubular vessel packed with the at least one molecular sieve adsorbent (i.e., the at least one copolymer polyol enters one end of the packed tubular vessel and exits the opposite end of the packed tubular vessel) such that the at least one copolymer polyol contacts the at least one molecular sieve adsorbent for a sufficient contact time period and contact temperature such that the at least one molecular sieve adsorbent adsorbs at least a portion of the residual monomers and volatiles present in the at least one copolymer polyol.

For example, when a continuous process is used, another embodiment of the process may include using a membrane with a portion made from the at least one molecular sieve adsorbent material. Typically, such membranes have porous composite structures, which comprises at least a porous support and a molecular sieve layer applied to the support, such as described, for example in U.S. Pat. Nos. 6,387,269 and 6,440,885. The porous support is a ceramic material or metal oxide selected from the group consisting of aluminum oxide, silicon dioxide, zirconium oxide, silicon nitride and silicon carbide or a combination thereof. The molecular sieve type could be any one among type Y, ZMS-5, Beta and Mordenite and mixtures thereof. The composite membrane may take any shape including circular, rectangular, square or tubular in nature. A liquid stream containing a set of components that needs to be separated is brought in contact with such a porous composite membrane, often times being swept through one side of it with a residence time sufficient to allow a significant portion of the components to be separated by diffusion through the membrane to the other side. The portion of the liquid stream that reaches the other side of the membrane is called permeate and the portion of the liquid left behind is denoted as the retentate.

In this continuous process, the contacting step (c) of the process can be carried out by passing the at least one copolymer polyol along one side of the composite membrane, a part of which is made from the at least one molecular sieve adsorbent material, such that the at least one copolymer polyol contacts the composite membrane for a sufficient contact time period and contact temperature such that the at least one molecular sieve adsorbent portion of the membrane facilitates permeation of at least a portion of the residual monomers and volatiles present in the at least one copolymer polyol to the other side of the membrane, with a portion of the copolymer polyol stream remaining as the retentate.

In conventional processes, a stripping operation is typically performed and such stripping operation is typically performed using a high heat treatment to remove residual compounds. A high heat treatment of the CPP product can produce a CPP product with an undesirable yellowing (or discoloration) effect. Thus, another advantage of the present invention process can be that the CPP product does not exhibit a yellowing effect since the present invention process can be carried out at a lower temperature and at a shorter process time compared to the known stripping operations.

The CPP product having a reduced content of residual monomers and volatiles produced as described above can be used to produce a polyurethane foam-forming reaction mixture composition including the step of admixing the above CPP product, as a reactant product, with a isocyanate reactant product. The reaction mixture, in turn, is used in a process for producing a polyurethane foam article by reaction schemes well known in the art.

For example, in preparing a flexible polyurethane foam article or product, an A-side material and a B-side material is first prepared; wherein the A-side material includes at least one isocyanate-containing material and wherein the B-side includes the at least one CPP described above. Then the A-side material and B-side material are mixed together to form the polyurethane foam-forming reaction mixture. The reactive blend is then subjected to conditions sufficient to cure the reactive blend to form a flexible polyurethane foam. The A-side material can include at least one isocyanate-containing material such as 2,4- and/or 2,6-toluene diisocyanate (TDI), diphenylmethanediisocyanate (MDI), and various isomers or derivatives of MDI; and the B-side can include at least one of the CPP products described above.

Other optional additives or compounds can be added to the A-side material, to the B-side material, or to both the A-side material and the B-side material. For example, the optional compounds can include at least one crosslinker; at least one reactive catalyst; at least one surfactant; a medium such as water; and mixtures thereof.

Any of the known blowing agents conventionally used in the production of polyurethane foams can be used. Suitable blowing agents include water, halogenated hydrocarbon of low molecular weight, carbon dioxide and low boiling hydrocarbons. The blowing agents are used in amounts well known to skilled persons.

In addition to the above-mentioned materials, any number of variety of additives conventionally used in the production of polyurethane foams such as, for example, fire retardants, defoamers, antioxidants, mold release agents, dyes, pigments, and fillers can also be used in the process of the present invention. These additives are used in amounts well known to skilled persons for their function and use.

Using a CPP product having lower concentrations of residual monomers and volatiles is desirable for use in making a foam product because the resulting foam product having lower concentrations of residual monomers and volatiles may, in turn, have for example: (1) lower smell/odor, (2) no evaporation of toxic monomers, and (3) less fogging in car interiors when the foam is used in automotive applications.

The flexible polyurethane foam prepared from the polyurethane foam-forming reaction mixture composition described above can be formed into a foam article or product using molding processes known to those skilled in the art. The foam-forming composition and foams produced from such composition can be used in various applications including for example in a variety of packaging, seating, and other cushioning applications, such as mattresses, furniture cushions, automotive seating, bumper pads, sport and medical equipment, helmet liners, pilot seats, earplugs, and various other applications.

EXAMPLES

The following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) which follow are explained hereinbelow.

"GC-MS" stands for gas chromatography-mass spectrometry.

"VOC" stands for volatile organic compounds.

Various raw materials or ingredients used in the Examples are explained herein below and in Table I as follows:

HL400 is a non-reactive copolymer polyol, 43% solids, and is available from The Dow Chemical Company.

V3943 is a non-reactive copolymer polyol, 42% solids, and available from The Dow Chemical Company.

TABLE I

Adsorbent Materials

| Adsorbent | Ingredient | Brief Description | $SiO_2/Al_2O_3$ (mol/mol) | Supplier |
|---|---|---|---|---|
| 1 | $NH_4$-ZSM-5 | molecular sieve | 46 | Zeolyst |
| 2 | H-ZSM-5 | molecular sieve | 200 | Zeochem |
| 3 | Na-ZSM-5 | molecular sieve | 100 | Zeocat |
| 4 | H-BETA | molecular sieve | 50 | EastBioChem |
| 5 | H-MORDENITE | molecular sieve | 90 | Zeolyst |
| 6 | Na—Y | molecular sieve | 5.1 | Zeolyst |
| 7 | H—Y | molecular sieve | 5.1 | Zeolyst |
| 8 | Na-MORDENITE | molecular sieve | 26 | Zeolyst |
| 9 | Active Carbon | activated carbon adsorbent | n.a.* | SiCat Catalyst |

Notes for Table I:
*"n.a." means not applicable

Laboratory Scale Examples

Comparative Example A 10 grams (g) of CPP was added to a reactor vessel. Then, CPP was heated to 90° C. under continuous mixing for 60 min. Thereafter, the resulting heated sample was cooled down to 25° C.; and the headspace of the obtained reactor sample was analyzed for residual VOCs using GC-MS after equilibration at 150° C. and 20 min. The results of this example are described in Table II.

Comparative Example B

An adsorbent, $NH_4$—ZSM with a silica-to-alumina ratio ($SiO_2/Al_2O_3$) [mol/mol] equal to (=) 46 (1 g), was first calcinated according to the following procedure:

Calcination occurred in static air (e.g., in a box oven) using the following temperature program: (1) heat from room temperature (RT; about 25° C.) to 550° C. at 3° C./minute (° C./min), (2) dwell at 550° C. for 4 hr, and then (3) cool down to RT overnight. Note that the $NH_4$-form of zeolite transforms up to the H-form after the above calcination step.

0.5 g of calcined molecular adsorbent 1 was added to 9.5 g of CPP (V3943) in a reactor vessel to form a mixture in the reactor. Then, the resulting mixture was heated to 90° C. under continuous mixing for 60 min. Thereafter, the resulting heated sample was cooled down to RT; and the headspace of the obtained reactor sample was analyzed for residual VOCs using GC-MS after equilibration at 150° C. and 20 min. The results of this example are described in Table II.

Comparative Example C

The same procedure as described in Comp. Ex. B was used in this Comp. Ex. C, except that H-Mordenite with a $SiO_2/Al_2O_3=90$ was used. The results of this example are described in Table II.

Comparative Example D

The same procedure as described in Comp. Ex. B was used in this Comp. Ex. D, except that Na—Y with a $SiO_2/Al_2O_3=5.1$ was used. The results of this example are described in Table II.

Comparative Example E

The same procedure as described in Comp. Ex. B was used in this Comp. Ex. E, except that Na-Mordenite with a $SiO_2/Al_2O_3=26$ was used. The results of this example are described in Table II.

Comparative Example F

The same procedure as described in Comp. Ex. B was used in this Comp. Ex. F, except that active carbon was used. The results of this example are described in Table II.

Inventive Example 1

An adsorbent, H-ZSM-5 with a $SiO_2/Al_2O_3=200$ (1 g), was calcinated according to the following procedure:

Calcination occurred in static air (e.g., in a box oven) using the following temperature program: (1) heat from RT to 550° C. at 3° C./min, (2) dwell at 550° C. for 4 hr, and then (3) cool down to RT overnight.

0.5 g of calcined molecular adsorbent 2 was added to 9.5 g of CPP (V3943) and added in a reactor vessel to form a mixture. Then, the resulting mixture was heated to 90° C. under continuous mixing for 60 min. Thereafter, the resulting sample was cooled down to RT; and the headspace of the obtained reactor sample was analyzed for residual VOCs using GC-MS after equilibration at 150° C. and 20 min. The results of this example are described in Table II.

Inventive Example 2

The same procedure as described in Inv. Ex. 1 was used in this Inv. Ex. 2, except that Na-ZSM-5 with a $SiO_2/Al_2O_3=100$ was used. The results of this example are described in Table II.

Inventive Example 3

The same procedure as described in Inv. Ex. 1 was used in this Inv. Ex. 3, except that H-BETA with a $SiO_2/Al_2O_3=50$ was used. The results of this example are described in Table II.

Inventive Example 4

The same procedure as described in Inv. Ex. 1 was used in this Inv. Ex. 4, except that H—Y with a $SiO_2/Al_2O_3=5.1$ was used. The results of this example are described in Table II.

TABLE II

Concentrations of Volatiles (ppm) in CPP, 5% Zeolite, 90° C.

| Example No. | Adsorbent No. | Acrylonitrile | Toluene | Styrene |
|---|---|---|---|---|
| Comp. Ex. A | no adsorbent used | 2.1 | 0.1 | 16.9 |
| Comp. Ex. B | 1 | 0.3 | 38.4 | 17.3 |
| Comp. Ex. C | 5 | 1.7 | 43.8 | 26.2 |
| Comp. Ex. D | 6 | 0.3 | 0.3 | 16.1 |
| Comp. Ex. E | 8 | 0.8 | 29.2 | 22.1 |
| Comp. Ex. F | 9 | 1.5 | 46.4 | 39.3 |
| Inv. Ex. 1 | 2 | 0.6 | 2 | 3.3 |
| Inv. Ex. 2 | 3 | 0.0 | 0.3 | 12.9 |
| Inv. Ex. 3 | 4 | 0.6 | 11 | 6.7 |
| Inv. Ex. 4 | 7 | 0.3 | 15.9 | 1.4 |

Comparative Example G 10 g of CPP was added to a reactor vessel. Then, CPP was heated to 125° C. under continuous mixing for 60 min. Thereafter, the resulting heated sample was cooled down to RT; and the headspace of the obtained reactor sample was analyzed for residual VOCs using GC-MS after equilibration at 150° C. and 20 min. The results of this example are described in Table III.

Comparative Example H

An adsorbent, $NH_4$-ZSM with a $SiO_2/Al_2O_3=46$ (1 g), was first calcinated according to the following procedure:

Calcination occurred in static air (e.g., in a box oven) using the following temperature program: (1) heat from RT to 550° C. at 3° C./min, (2) dwell at 550° C. for 4 hr, and then (3) cool down to RT overnight. Note that the $NH_4$-form of zeolite transforms up to the H-form after the above calcination step.

0.5 g of calcined molecular adsorbent 1 was added to 9.5 g of CPP (V3943) and added in a reactor vessel to form a mixture in the reactor. Then, the resulting mixture was heated to 125° C. under continuous mixing for 60 min. Thereafter, the resulting heated sample was cooled down to RT; and the headspace of the obtained reactor sample was analyzed for residual VOCs using GC-MS after equilibration at 150° C. and 20 min. The results of this example are described in Table III.

Inventive Example 5

An adsorbent, H-ZSM-S with a $SiO_2/Al_2O_3=200$ (1 g), was calcinated according to the following procedure:

Calcination occurred in static air (e.g., in a box oven) using the following temperature program: (1) heat from RT to 550° C. at 3° C./min, (2) dwell at 550° C. for 4 hr, and then (3) cool down to RT overnight. Note that NH$_4$-form of zeolites transform up to the H-form after the above calcination step.

0.5 g of calcined molecular adsorbent 2 was added to 9.5 g of CPP (V3943) and added in a reactor vessel to form a mixture. Then, the resulting mixture was heated to 125° C. under continuous mixing for 60 min. Thereafter, the resulting sample was cooled down to RT; and the headspace of the obtained reactor sample was analyzed for residual VOCs using GC-MS after equilibration at 150° C. and 20 min. The results of this example are described in Table III.

Inventive Example 6

The same procedure as described in Inv. Ex. 5 was used in this Inv. Ex. 6, except that Na-ZSM-5 with a SiO$_2$/Al$_2$O$_3$=100 was used. The results of this example are described in Table III.

Inventive Example 7

The same procedure as described in Inv. Ex. 5 was used in this Inv. Ex. 7, except that H-BETA with a SiO$_2$/Al$_2$O$_3$=50 was used. The results of this example are described in Table III.

Inventive Example 8

The same procedure as described in Inv. Ex. 5 was used in this Inv. Ex. 8, except that H-Mordenite with a SiO$_2$/Al$_2$O$_3$=90 was used. The results of this example are described in Table III.

Inventive Example 9

The same procedure as described in Inv. Ex. 5 was used in this Inv. Ex. 8, except that Na—Y with a SiO$_2$/Al$_2$O$_3$=5.1 was used. The results of this example are described in Table III.

Inventive Example 10

The same procedure as described in Inv. Ex. 5 was used in this Inv. Ex. 8, except that H—Y with a SiO$_2$/Al$_2$O$_3$=5.1 was used. The results of this example are described in Table III.

Inventive Example 11

The same procedure as described in Inv. Ex. 5 was used in this Inv. Ex. 8, except that Na-Mordenite with a SiO$_2$/Al$_2$O$_3$=26 was used. The results of this example are described in Table III.

Inventive Example 12

The same procedure as described in Inv. Ex. 5 was used in this Inv. Ex. 8, except that active carbon was used. The results of this example are described in Table III.

TABLE III

Concentrations of Volatiles (ppm) in CPP, Different Treatments, 5% Zeolite, 125° C.

| Example No. | Adsorbent No. | Acrylonitrile | Toluene | Styrene |
|---|---|---|---|---|
| Comp. Ex. G | no adsorbent used | 0.3 | 19.2 | 3 |
| Comp. Ex. H | 1 | 0.8 | 36.9 | 20.8 |
| Inv. Ex. 5 | 2 | 0.8 | 5.8 | 1.7 |
| Inv. Ex. 6 | 3 | 0.2 | 4.4 | 5.8 |
| Inv. Ex. 7 | 4 | 2.1 | 7.4 | 0 |
| Inv. Ex. 8 | 5 | 1 | 0.6 | 6.8 |
| Inv. Ex. 9 | 6 | 1 | 4.3 | 6.5 |
| Inv. Ex. 10 | 7 | 0.8 | 3.1 | 0 |
| Inv. Ex. 11 | 8 | 0.2 | 0.5 | 6.6 |
| Inv. Ex. 12 | 9 | 1.2 | 2.6 | 8.8 |

Comparative Example I 10 g of CPP was added to a reactor vessel. Then, CPP was heated to 125° C. under continuous mixing for 60 min. Thereafter, the resulting heated sample was cooled down to RT; and the headspace of the obtained reactor sample was analyzed for residual VOCs using GC-MS after equilibration at 150° C. and 20 min. The results of this example are described in Table IV.

Inventive Example 13

A H—Y with a SiO$_2$/Al$_2$O$_3$=5.1 (1 g) was calcinated according to the following procedure:

Calcination occurred in static air (e.g., in a box oven) using the following temperature program: (1) heat from RT to 550° C. at 3° C./min, (2) dwell at 550° C. for 4 hr, and then (3) cool down to RT overnight.

0.5 g of calcined molecular adsorbent 7 was added to 9.5 g of CPP (HL400) and added in a reactor vessel to form a mixture. Then, the resulting mixture was heated to 125° C. under continuous mixing for 60 min. Thereafter, the resulting sample was cooled down to RT; and the headspace of the obtained reactor sample was analyzed for residual VOCs using GC-MS after equilibration at 150° C. and 20 min. The results of this example are described in Table IV.

Inventive Example 14

The same procedure as describe in Inv. Ex. 13 was used in this Inv. Ex. 14, except that the resulting mixture was heated to 90° C. instead of 125° C. The results of this example are described in Table IV.

TABLE IV

Concentrations of Volatiles (ppm) in CP, Different Treatments, 10% Zeolite

| Example | Temperature | Adsorbent | Acrylonitrile | Toluene | Styrene |
|---|---|---|---|---|---|
| Comp. Ex. I | 125° C. | no adsorbent used | 2.55 | ND* | 85.2 |
| Inv. Ex. 13 | 125° C. | 7 | 0.28 | ND* | 20.3 |

TABLE IV-continued

Concentrations of Volatiles (ppm) in CP, Different Treatments, 10% Zeolite

| Example | Temperature | Adsorbent | Acrylonitrile | Toluene | Styrene |
|---|---|---|---|---|---|
| Inv. Ex. 14 | 90° C. | 7 | 0.38 | 0.06 | 45.5 |

*"ND" stands for "not detected".

OTHER EMBODIMENTS

In one embodiment, the present invention includes a copolymer polyol precursor composition including: (i) at least one copolymer polyol containing a first initial content (or concentration) of residual monomers and volatiles; and (ii) at least one molecular sieve adsorbent adapted for removing at least a portion of a first initial content of residual monomers and volatiles present in the at least one copolymer polyol from the at least one copolymer polyol and reducing the first initial content of residual monomers and volatiles present in the at least one copolymer polyol to a second reduced content of residual monomers and volatiles present in the at least one copolymer polyol. The initial residual monomers and volatiles content of the at least one copolymer polyol may be reduced to a concentration of less than 50 ppm.

In one preferred embodiment, the at least one molecular sieve used in the process is in powder form or extrudate form.

In another embodiment, the present invention includes a process for preparing a copolymer polyol precursor composition including the step of admixing: (I) the at least one copolymer polyol containing a first initial content of residual monomers and volatiles with (II) the at least one molecular sieve adsorbent adapted for removing at least a portion of the first initial content of residual monomers and volatiles present in the at least one copolymer polyol.

In still another embodiment, the present invention includes a purified copolymer polyol composition produced by the above process, wherein the copolymer polyol composition contains a concentration of residual monomers and volatiles of less than 50 ppm.

In even still another embodiment, the present invention relates to a process for making the copolymer polyol having a reduced content of residual monomers and volatiles as described above.

Another embodiment of the present invention can include a polyurethane foam-forming reaction mixture composition including: (A) the copolymer polyol having a reduced content of residual monomers and volatiles; and (B) at least one organic isocyanate.

In still another embodiment, the present invention relates to a process for making the above polyurethane foam-forming reaction mixture composition.

In yet another embodiment, the present invention includes a polyurethane foam including the reaction product of the above polyurethane foam-forming reaction mixture composition.

In even still another embodiment, the present invention includes a process for making the above flexible polyurethane foam. The above polyurethane foam can be used to manufacture, for example, a flexible polyurethane automotive interior article.

What is claimed is:

1. A continuous process for preparing a copolymer polyol containing a reduced content of residual monomers and volatiles comprising the steps of:

(a) providing at least one copolymer polyol containing a first initial content of residual monomers and volatiles;
(b) providing at least one molecular sieve adsorbent;
(c) contacting the at least one copolymer polyol with the at least one molecular sieve adsorbent for a period of time and at a temperature sufficient for the at least one molecular sieve adsorbent to adsorb at least a portion of the first initial content of residual monomers and volatiles present in the at least one copolymer polyol to reduce the first initial content of residual monomers and volatiles of the at least one copolymer polyol to form at least one copolymer polyol containing a second reduced content of residual monomers and volatiles; and
(d) separating the at least one molecular sieve adsorbent containing a portion of the first initial content residual monomers and volatiles from the at least one copolymer polyol to form at least one copolymer polyol containing a second reduced content of residual monomers and volatiles, wherein:

the at least one molecular sieve adsorbent of the continuous process comprises a composite membrane;
the continuous process comprises contacting the at least one copolymer polyol with the composite membrane of the at least one molecular sieve adsorbent;
the contact time period between the at least one copolymer polyol and the at least one molecular sieve adsorbent portion of the composite membrane is from 15 minutes to 2 hours; and
the contact temperature is at a temperature of from 70° C. to 160° C.

2. The continuous process of claim 1, including the step of stripping at least one copolymer polyol prior to the step (a) to provide at least one copolymer polyol containing a first initial content of residual monomers and volatiles.

3. The continuous process of claim 2, wherein the step of stripping is selected from vacuum stripping, steam stripping, and thin-wall evaporation.

4. The continuous process of claim 1, wherein the at least one molecular sieve adsorbent added to the at least one copolymer polyol is added at a concentration of from 1 weight percent to 15 weight percent based on the total weight of the molecular sieve adsorbent and copolymer polyol.

5. The continuous process of claim 1, wherein the volatiles include toluene at a first initial content of from 0.002 weight percent to 2 weight percent; wherein the residual monomers include styrene at a first initial content of from 0.005 weight percent to 3 weight percent; and wherein the residual monomers include acrylonitrile at a first initial content of from 0.002 weight percent to 2 weight percent, based on the total weight of the components in the least one copolymer polyol containing the first initial content of residual monomers and volatiles.

6. The continuous process of claim 1, wherein the first total initial content of residual monomers and volatiles is from 0.01 weight percent to 5 weight percent; and wherein the first total initial content of residual monomers and volatiles is reduced to a second reduced content of residual monomers and volatiles of from 0.0001 weight percent to 0.009 weight percent, based on the total weight of the components in the least one copolymer polyol containing the first initial content of residual monomers and volatiles.

7. The continuous process of claim 1, wherein the at least one molecular sieve adsorbent has a framework type of Mordenite, BEA, Faujasite, or MFI; or is activated carbon; or a mixture thereof.

8. The continuous process of claim 1, wherein the at least one molecular sieve adsorbent is in H-form; is in cation-exchanged form; or a mixture thereof.

* * * * *